Patented Oct. 13, 1942

2,298,630

UNITED STATES PATENT OFFICE 2,298,630

SECONDARY β PHENYL PROPYL AMINES AND PHARMACEUTICAL COMPOSITIONS THEREOF

Robert S. Shelton, Mariemont, Ohio, assignor to The Wm. S. Merrell Company, Cincinnati, Ohio, a corporation of Delaware No Drawing. Application December 24, 1940, Serial No. 371,574

10 Claims. (Cl. 260—570.8)

This invention relates to the novel chemical compounds beta-phenyl-beta-methyl-alpha (substituted amino) ethanes, including particularly both the free amine and the amine salts. More particularly the invention relates to compositions for physiological and therapeutic use for topical and internal administration.

It has been known prior to my invention that certain aryl substituted alkyl amines of the basic structure

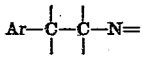

in which Ar is an aryl nucleus with or without attached groups such as —OH or —CH₃, are possessed of vaso-constrictor properties. For the most part such compositions are non-volatile, but the beta-phenyl-isopropyl amines represented by the formula PhCH₂CH(CH₃)NH₂, known commercially as Benzidrene, have substantial volatility at ordinary temperatures; and, largely because of this, they have come into extensive use in vaso-constrictors, particularly for the shrinking of nasal membranes for treatment of the common cold, hay fever, etc.

Other compounds which have been studied for their vaso-pressor effect and reported in the literature are the phenyl-ethyl amines, both alpha and beta, and the phenyl-propyl amines, alpha, beta and gamma. Thus, for example, in 1917 a rather extensive study of the pressor action of the amines was reported in the Journal of the Chemical Society, (London) vol. III, page 103, et seq. It was there shown that in the homologous series aniline, benzylamine, phenyl-ethyl amine (both alpha and beta), phenyl-propyl amine, there is an increasing activity up to phenyl-ethyl amine descreasing again with phenyl-propyl amine.

This conclusion confirmed an earlier report in the Journal of Physiology, 1910, vol. 41, page 19 et seq. and was in turn confirmed by further investigations of these and related compounds reported in the Journal of the American Chemical Society in 1931, vol. 53, page 1875 et seq. and the similar studies reported in the Journal of Pharmacology in 1929, vol. 36, pages 363 et seq., and in 1933, vol. 47, pages 339 et seq. In these latter publications, however, it was indicated that the addition of a methyl group to one end of the ethyl group in the beta-phenyl-ethyl amine did not noticeably impair the pressor effect. Nevertheless, it was observed by these investigators and has been confirmed by the present applicant that, in general, such increases in molecular weight result in significant increases in toxicity.

It was also brought out by these investigators that the change from the ethyl to propyl compounds of this type, if by addition of a methyl group to one end of the ethyl chain without altering the relative positions of the amino and phenyl groups prolongs the vaso-pressor effect without increasing its intensity. The logical inference from all this experience and evidence is that the beta-phenyl-isopropyl amine compounds are the optimum compounds of this type; and this clear inference has discouraged further modifications of the basic chemical structure by substitution thereon of methyl or other hydrocarbon groups.

The secondary and tertiary amines formed by adding methyl or ethyl groups to the amino nitrogen of β-phenyl-ethyl-amine and various hydroxy amines analogous to ephedrine have also been made and tested for their physiological properties, with the conclusion that primary amines tend to be more active and less toxic than corresponding methylated secondary and tertiary amines. (Hartung et al. J. A. C. S. 53 (1931) 4149 and Pyman J. Chem. Soc. (London) 111 (1917) 1103, 1122 quoting Barger & Dale J. Physiol. 41 (1910) 19.

It is also known that, in general, an increase in molecular weight in such an homologous series is accompanied by a decrease in volatility.

I have now found, however, contrary to all indications of the prior art, that the novel amine and amine salts, the beta-phenyl-beta-methyl-alpha- (substitute damino) ethanes

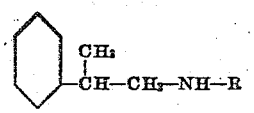

wherein "R" is methyl, vinyl or allyl, although they are of higher molecular weight than the beta-phenyl-isopropyl amine compounds and although they are secondary amines, exhibit surprising physiological activity, particularly as vaso-constrictors; and they are less toxic than, for example, other similar compounds of comparable activity. In addition certain of these compounds, especially the free amines, and salts of weak acids, show surprising volatility, which is of great advantage when such compound is used as an inhalent.

Comparative tests, for example on rabbits, with intravenous injection of d,l-beta-phenyl-betamethyl-alpha-(methyl-amino) ethane hydrochloride of the present invention showed a minimum lethal dose of 60 mg. per kg. of body weight, whereas under the same conditions corresponding d,l-beta-phenyl-isopropyl amine hydrochloride showed a minimum lethal dose of 20-25 mg. per kg. of body weight, i. e., the compound of my invention is shown by this test to be from less than ½ down to one-third as toxic as the corresponding phenyl-isopropyl amine compound. With the free amine of the present invention, a vapor pressure of 1 mm. is reached at 65° F., whereas the same pressure is reached by the d,l-beta-phenyl-isopropyl amine at 50°. Corresponding comparative tests with these two compounds show that, both in their shrinking of the nasal mucosa and in blood pressure rise, they exhibit substantially the same physiological activity.

Compared also with the corresponding primary amine compounds differing only in the absence of the substituent group on the amino nitrogen, the compounds of my present invention are more active and less toxic. Surprisingly, although the methyl amino compounds are less volatile inhalents, i. e., for application to nasal mucosa by drawing the breath over a mass of the volatile compound absorbed in a cotton pad. Contrary to expectation also the free amine is water soluble, which may account in part for its surprising effectiveness in vapor application to mucous mebrane.

The racemic compound may be resolved into the respective isomers in the usual manner.

The racemic compounds exhibit both vaso constrictor and stimulant action, but upon separation of the optical isomers it is found that the vaso constrictor action is stronger in the laevo isomer and the toxicity less, whereas the dextro isomer is more effective as a central stimulant, and whereas in other related compounds such as ephedrine the laevo isomer is the more toxic, in this case the relative toxicity is reversed, the laevo isomer here being of surprisingly low toxicity. The isomers, however, and the method of preparation are claimed in companion applications.

The allyl amino and vinyl amino compounds are close to the methyl amino compounds in their physiological properties.

Although I am giving below certain specific examples of my invention and its application in practical use and am giving also certain modifications and alternatives, it should be understood that these are not intended to be exhaustive or limiting the invention. On the contrary I am giving these as illustrations and am giving herewith explanations in order fully to acquaint others skilled in the art with my invention and the principles thereof and a suitable manner of its application in practical use, so that others skilled in the art may be enabled to modify the invention and to adapt it and apply it in numerous forms each as may be best suited to the requirements of a particular use.

The compounds of the present invention may be prepared, for example, as follows:

A mixture of 100 grams of β-phenyl-n-propyl chloride and approximately 50 grams of monomethylamine are dissolved in a suitable organic solvent such as 150 cc. of methyl alcohol and reacted under pressure with heat for a number of hours in an oil bath or electrically heated container to about 130° C. The container is then cooled in ice and opened carefully to remove the reaction mixture. The reaction mixture is then warmed slightly to remove the unreacted monomethylamine and the product subject to distillation under vacuum. The purified material boils at 99-100° C. at 19 mm.

The corresponding allyl amino and vinyl amino compounds may be made by the same method using allyl amine and vinyl amine respectively.

The compounds of my invention may be made by other methods already known for synthesis of related compounds, e. g., by methylation, vinylation or allylation of the corresponding primary amine by methyl, vinyl or allyl chloride; or by reacting the primary amine with formaldehyde, vinyl aldehyde or propenyl aldehyde in the presence of hydrogen or other reducing agent.

The beta-phenyl-beta-methyl-alpha (substituted amino) ethanes of the present invention may be used as a free amine or as a salt formed by combination with any suitable acid radical. Where the compound is to be used in a volatile nasal inhalent, i. e., by drawing the breath over a supply of the volatile pressor compound so as to pick up an effective concentration of vapor before passing into the nostril, the free base or salts of weak acids, e. g., the carbonates, will be chosen because of their relatively high volatility. Ordinarily the free amine will be used to charge the inhaler tube, but this may react with the air to form the carbonate, which may thus become the compound actually applied to the nasal mucosa. Where the compound is to be used for topical application, e. g., as in nose drops or sprays, or for oral administration, other salts may be used in substance or in solution or in mixture with other ingredients. For this purpose the levulinate has been found most advantageous in its physiological action, but the sulfate and hydrochloride have also been found suitable and easy to prepare. It will be understood that the acid radical may have an influence on properties other than volatility, e. g., toxicity, solubility, stability, cost of manufacture, etc., and I have also found that the vaso-pressor properties of amines of this type can be combined with physiological properties of an acid radical, as for example the salt of acetyl salicylic acid with the amine of this invention may be used to combine the physiological activities of the acid with that of the amine. The antipyretic activity of the salicylate can be combined with the action of the amine on uterine muscle which lends itself to treatment of certain conditions such as dysmenorrhea. In general where the physiological properties of only the amines are desired and the highest volatility is not required I have found that the levulinate is best.

As an example of the use of these materials, a composition particularly suitable for use as a nasal inhalent may be made as follows:

| | Parts |
|---|---|
| Menthol | 1 |
| Camphor | 1 |
| Beta-phenyl-beta-methyl-alpha (methyl amino) ethane (as the free amine) | 8 |

The camphor and menthol are dissolved in the amine and the solution applied to a pledget of cotton and placed in an inhaler device. The proportions of menthol and camphor may be made to vary widely and they may be replaced by any other suitable aromatic or mixture of aromatic substances such as eucalyptol, oil of lavender, oil of rose, etc. The proportion of amine may be increased or decreased if desired.

A material suitable for use as nose drops may be made as follows:

| | Per cent |
|---|---|
| β- phenyl -β- methyl -α- (methyl-amino)-ethane as free amine | ½ |
| Molecular equivalent of inorganic or organic acids such as hydrochloric, sulfuric, lactic, gluconic, isoascorbic, levulinic, and related compounds. | |
| Cetyl pyridinium chloride | 0.033 |
| Aromatics | 0.05 |
| Sorbitol | 4 |
| Distilled water, q. s. | |

The sorbitol is added to make the product isotonic. The pH of the solution is adjusted to approximately 7. The surface tension of this material is 34.5 dynes per square centimeter which probably accounts at least in part for its very quick action, e. g., as compared with corresponding ephedrine sulfate preparations. We prefer to use organic acid salts rather than mineral acid salts since they are less irritating.

The use of sorbitol in this manner and also the use of a surface tension depressant (cetyl pyridinium chloride serves this function as well as being strongly germicidal) has important advantage even when used with other types of vasopressors, e. g., ephedrine or benzidrene, etc.

Oil vehicle nose drops may be made as follows:

| | Parts |
|---|---|
| Beta-phenyl-beta-methyl-alpha (methyl-amino) ethane | 0.5 |
| Oil of eucalyptus | 1.0 |
| Mineral oil to make | 100.0 |

The free amine may be replaced by any of its oil-soluble fatty acid salts such as the oleate, palmitate, etc.; the oil of eucalyptus may be replaced by any of those aromatics commonly used in nose drops such as varying proportions of menthol, camphor, thymol, etc.; and the mineral oil may be replaced by a vegetable oil such as peanut oil, cottonseed oil, sesame oil, etc.

Another suitable preparation in an aqueous vehicle may be made according to the formula:

| | Parts |
|---|---|
| Beta-phenyl-beta-methyl-alpha (methyl amino) ethanesulfate | 1.0 |
| Menthol | 0.05 |
| Sodium chloride | 0.7 |
| Chlorbutanol | 0.5 |
| Distilled water to make | 100.0 |

The amine sulfate may be replaced by any other water-soluble acid addition salt of the free amine such as the phosphate, hydrochloride, etc., or the water-soluble organic salts, or by the free amine; the menthol may be replaced by a suitable quantity of any other aromatic or combination of aromatics such as methyl salicylate, oil of spearmint, etc.; the sodium chloride may be replaced by any other substance such as dextrose to impart tonicity or by suitable quantities of buffer salts such as phosphates of sodium to adjust the pH; the chlorbutanol may be replaced by any other suitable preservative; agents such as gums, tragacanth, karaya and the like may be used to impart viscosity and thus promote retention of the medicament in the nostrils, and the composition may if desired be supplied as a jelly.

For oral administration, for example, for control of blood pressure, a composition such as the following would be suitable:

| | Parts |
|---|---|
| Beta-phenyl-beta-methyl alpha (methyl amino) ethane levulinate | 0.4 |
| Butyl para-hydroxy benzonate | 0.02 |
| Syrup of raspberry, to make | 100.0 |

The sulfate radical of the amine salt may be replaced by any other suitable anion such as sulfate, phosphate, halide, ascorbate, etc.; the butyl para-hydroxy benzoate may be replaced by a suitable quantity of any other preservative such as sodium benzoate, alcohol, etc.; and the raspberry syrup may be replaced by any other palatable flavoring syrup or elixir and further sweetened, or otherwise modified if desired, by an agent such as saccharin, extract of glycyrrhiza, etc. Alternatively, the amine salt may be mixed with a suitable diluent such as lactose, granulated and compressed into tablets for oral administration.

I use the plural form "beta-phenyl-beta-methyl-alpha-(substituted amino)-ethanes" and specifically "beta-phenyl-beta-methyl-alpha-(methyl amino)-ethanes," "beta-phenyl-beta-methyl-alpha-(vinyl amino)-ethanes" and "beta-phenyl-beta-methyl-alpha-(allyl amino)-ethanes" to include the free amines specified and their salts and the optical isomers as well as mixtures of them.

What I claim is:

1. The chemical compounds beta-phenyl-beta-methyl-alpha-(substituted amino) ethanes having the formula

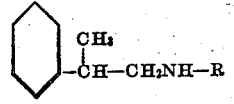

wherein R is a radical of the group consisting of methyl, vinyl and allyl.

2. The chemical compounds beta-phenyl-beta-methyl-alpha-(methyl amino) ethanes.

3. The chemical compounds beta-phenyl-beta-methyl-alpha-(vinyl amino) ethanes.

4. The chemical compounds beta-phenyl-beta-methyl-alpha-(allyl amino) ethanes.

5. The chemical compound beta-phenyl-beta-methyl-alpha-(methyl amino) ethane.

6. The chemical compounds beta-phenyl-beta-methyl-alpha-(methyl amino) ethane salts.

7. A vaso-constrictor composition which comprises as active ingredient therein at least one of the beta-phenyl-beta-methyl-alpha-(substituted amino) ethanes having the formula

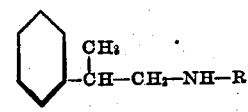

wherein R is a radical of the group consisting of methyl, vinyl and allyl.

8. A vaso-constrictor composition which comprises as active ingredient therein at least one of the beta-phenyl-beta-methyl-alpha-(methyl amino) ethanes.

9. A vaso-constrictor composition which comprises as active ingredient therein at least one of the beta-phenyl-beta-methyl-alpha-(vinyl amino) ethanes.

10. A vaso-constrictor composition which comprises as active ingredient therein at least one of the beta-phenyl-beta-methyl-alpha-(allyl amino) ethanes.

ROBERT S. SHELTON.